Patented June 2, 1931

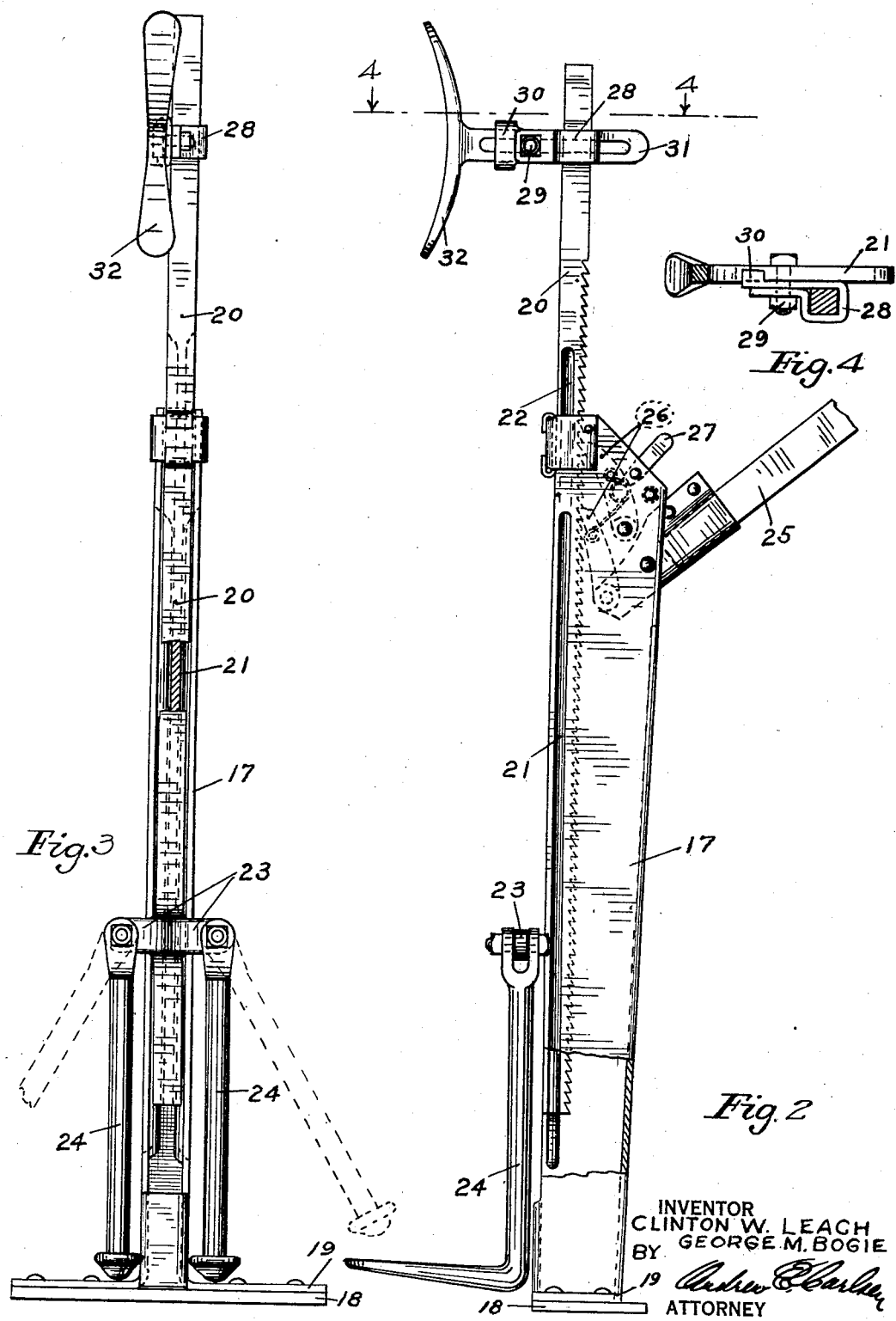

1,808,172

UNITED STATES PATENT OFFICE

CLINTON W. LEACH, OF MINNEAPOLIS, AND GEORGE M. BOGIE, OF GLENWOOD, MINNESOTA, ASSIGNORS OF ONE-THIRD TO GEORGE C. LEACH, OF RIVER FALLS, WISCONSIN

VEHICLE JACK AND SUPPORT MECHANISM

Application filed August 5, 1929. Serial No. 383,606.

This invention relates to jacks for motor vehicles, and the primary object is to provide a double unit mechanism including a jack or lift unit that can be applied to the outer side of a vehicle wheel, to do the required lifting, and an adjustable, quickly releasable support unit for holding the car raised so that the outer unit, or jack proper, can be removed, thus permitting the tire to be removed and replaced, in the case of tire trouble. The jack unit proper is also particularly adaptable for use in extricating a vehicle wheel when the same becomes mired in soft ground or ruts, in which event, as is well known, it is virtually impossible to apply an ordinary jack as access to the axle housing or adjacent frame parts becomes so difficult. In such event, with the present device in use, the wheel can be lifted to a sufficient height so that the rut or ditch can be filled with rocks or wood to give a more substantial support for the wheel when the jack is released and removed.

The invention as above noted, and with further and more detailed objects and advantages, will be more fully set forth in the following specification, reference being had to the accompanying drawings, in which:

Fig. 2 is an enlarged elevation of the jack unit proper, with fractional portions broken away for purpose of illustration.

Fig. 3 is a front elevation of the jack as seen from the left in Fig. 2.

Fig. 4 is a sectional detail view on the line 6—6 in Fig. 2.

Figure 1:
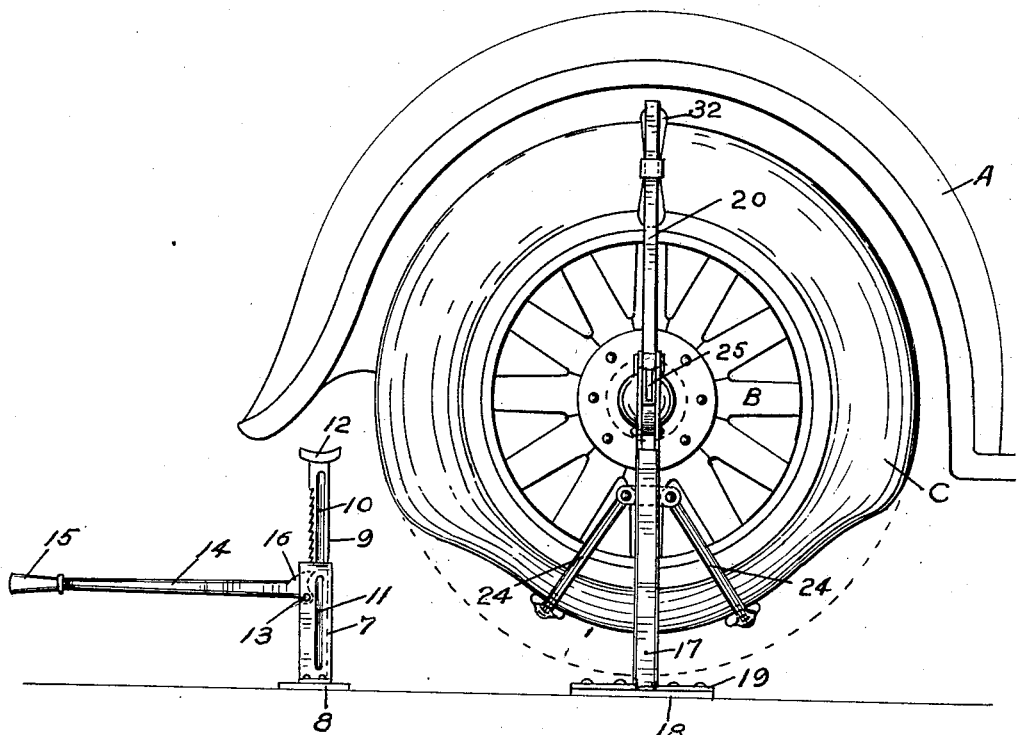
Fig. 1 is a side elevation of the wheel and fender portion of a car, showing it as raised by our improved jack and showing the adjustable support in readiness to be put in place under the axle.

Referring to the drawings more particularly and by reference characters, A designates the fender of a car, having a wheel B, provided with the usual tire C. The so-called adjustable support, shown in Fig. 1, comprises a hollow standard 7 secured to the base plate 8. A toothed rack 9 is slidably secured in the standard 7, and is provided with side grooves 10 that slidably engage inwardly formed ribs 11 in the side plates of the standard. These ribs 11 not only form a guiding means for the toothed rack, but also serve to reinforce the standard, which can thus be made of heavy sheet metal. The upper end of the rack 9 is provided with a saddle 12, which may be of any convenient form to fit under the axle housing or some other part of the car.

Pivotally secured to the standard 7, as at 13, is a hand lever 14 having a handle 15 at its outer end. The inner end of the lever 14 is provided with a pawl 16 for engagement with the toothed rack 9. The rack 9 is pulled up into any desired position, and is so held by lifting the lever 14 to engage the pawl 16, as indicated in Fig. 1.

The jack unit comprises a hollow standard 17 having a base 18 to which the standard is rigidly secured, as by angle iron extensions 19. A toothed rack bar 20 is slidably secured in the standard 17, and is guided by a pair of impressed ribs 21, that operate in slots 22 of the rack bar, in the same manner as previously described in connection with the adjustable support. In this instance, however, the rack bar is exposed to what may be conveniently termed the front of the jack, as shown in Fig. 3, and near its lower end is provided with a pair of laterally projecting lugs 23, to which are pivotally secured a pair of lifting hooks 24. These hooks are preferably made of ordinary bar steel, bent in the form of a right angle, and pivoted so that they will swing outwardly from the jack standard 17, as shown in Fig. 1.

The rack 20 is raised and lowered by a manually operated lever 25, which operates a pair of pawls 26 (shown in dotted lines in Fig. 2), and the action of which pawls can be reversed by tripping a latch 27. The lifting arrangement, indicated in Fig. 2, is of standard construction, and need not be described in detail, particularly so as this device does not form a part of the present invention, as such, and might be substituted for any suitable type of lifting and lowering mechanism.

Adjustably secured to the upper end of the rack bar 20 is a bracket mechanism consisting of a metal clamping strap 28, to which is slidably secured, as by a bolt 29 and lugs 30, a slotted bar 31 having an arcuate rest member 32. By loosening the bolt 29 the slotted bar 31 can be adjusted forwardly with respect to the rack bar 20, thus changing the position of the rest member 32 as occasion may require. The bolt 29 may also be used to secure the member 28 to the rack bar, although this is not necessary because there is no objection to having the bracket loosely fitted upon the rack bar.

The operation of the device may be briefly described as follows: When a tire is to be changed on a car, or if the wheel B and tire C become imbedded in a rut or ditch in the road, the jack unit is placed alongside of the wheel and the bracket member 28—32 is so placed that the rest member 32 will contact against the upper part of the tire or wheel, as indicated in Fig. 1. The lifting hooks 24 are then set in place under the wheel and at opposite sides from its center, whereupon the hand lever 25 is operated to raise the rack bar 20. This action causes the hook members 24 to raise the wheel, and as the rest member 32 contacts with the upper end thereof the jack is prevented from tilting inwardly against the car, as would otherwise be the case.

When the car is sufficiently raised, the adjustable support unit, shown in Fig. 1, is put in place, but before this is done the rack bar 9 is lifted up to a position whereby the saddle 12 will just slip under the axle housing or some other part of the car. The rack bar is held upward by lifting the hand lever 14 and holding it in that position until the car has been released and settled down upon the support, after which the lever 14 will be held in place by reason of the engagement of the rack bar with the pawl 16.

The jack unit is now removed whereupon the tire of the wheel can be removed and a new one put in place, and as soon as the wheel is again in shape to be run the operator has only to press down or step on the handle 15 of the lever 14, whereupon the rack bar 9 is released and the saddle 12 becomes free from any contact with the car.

It is understood that suitable modifications may be made in the structure as disclosed, provided such modifications come within the spirit and scope of the appended claims. Having now therefore fully illustrated and described our invention what we claim to be new and desire to protect by Letters Patent is:

1. A jack comprising a standard, a member vertically movable in the standard, a pair of lifting hooks pivotally secured to the member for engagement under a wheel, and means at the upper end of the member for abutting engagement with the upper outer part of the wheel.

2. A jack comprising a standard, a member vertically movable in the standard, a pair of lifting hooks pivotally secured to the member for engagement under a wheel, an abutment element, and means for adjustably securing the element to the upper end of the said member in a position for lateral contact with an upper part of the wheel engaged by the lifting hooks.

3. A jack of the character described comprising a base, a vertically movable member carried by the base, a pair of lift hooks carried by the member for engagement under a vehicle wheel, and a rest member at the upper end of the movable member for lateral contact engagement with the upper part of the wheel to be lifted.

4. A jack of the character described comprising a base, a vertically movable member carried by the base, a pair of lift hooks carried by the member for engagement under a vehicle wheel, a rest member at the upper end of the movable member for lateral contact engagement with the upper part of the wheel to be lifted, and means for vertically adjusting the rest member with respect to the lift hooks.

5. A jack of the character described comprising a base, a vertically movable member carried by the base, a pair of lift hooks carried by the member for engagement under a vehicle wheel, and rest member at the upper end of the movable member for lateral contact engagement with the upper part of the wheel to be lifted, said lift hooks being pivotally mounted whereby they may be swung sidewise with respect to the vertically movable member.

6. A jack of the character described comprising a hollow standard having inwardly opposed vertical ribs formed therein, a rack bar slidable in the standard and having channels to receive said ribs, a pair of lift hooks carried by the rack bar to engage under the wheel of a car, and means at the upper end of the rack bar for abutting contact with an upper part of the wheel to brace the jack in a vertical position.

7. A jack of the character described comprising a hollow standard having inwardly opposed vertical ribs formed therein, a rack bar slidable in the standard and having channels to receive said ribs, a pair of lift hooks carried by the rack bar to engage under the wheel of a car, and means at the upper end of the rack bar for abutting contact with an upper part of the wheel to brace the jack in a vertical position, said means including an arcuate contact member and means for slidably mounting the same on the rack bar.

8. A jack of the character described comprising a standard, a bar slidable in the standard, means for raising the bar, a pair of hooks pivotally secured to the bar, near the lower end thereof, and an abutment brace at the upper end of the bar.

9. A jack of the character described comprising a standard, a bar slidable in the standard, means for raising the bar, a pair of hooks pivotally secured to the bar, near the lower end thereof, and an abutment brace at the upper end of the bar, said hooks being outwardly swingable, in a common plane.

10. A jack of the character described comprising a standard, a bar slidable in the standard, means for raising the bar, a pair of hooks pivotally secured to the bar, near the lower end thereof, a rest brace at the upper end of the bar, and means for adjustably mounting the rest brace whereby it will be laterally and longitudinally adjustable with respect to the bar.

Signed at Minneapolis, in the county of Hennepin and State of Minnesota, this 3rd day of August, 1929.

CLINTON W. LEACH.
GEORGE M. BOGIE.